Dec. 28, 1943.  W. H. WINEMAN  2,337,582
PRESSURE CONTROLLING APPARATUS
Filed Dec. 27, 1941  2 Sheets-Sheet 1

Inventor:
Wade H. Wineman
by
Paris A. Maxim.
Atty.

Dec. 28, 1943.   W. H. WINEMAN   2,337,582
PRESSURE CONTROLLING APPARATUS
Filed Dec. 27, 1941   2 Sheets-Sheet 2
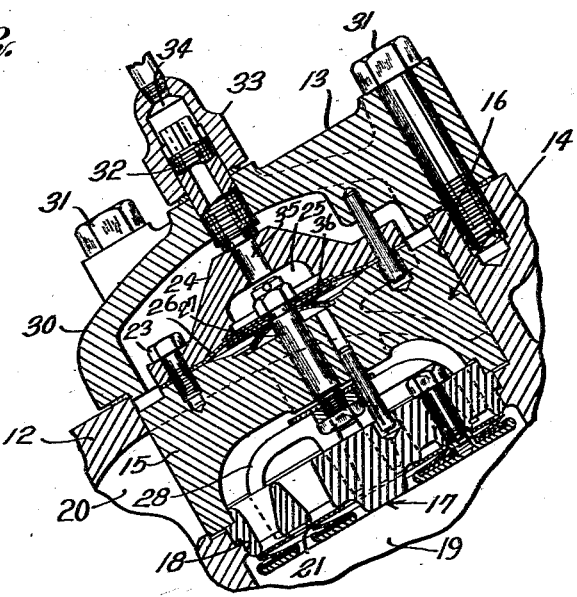
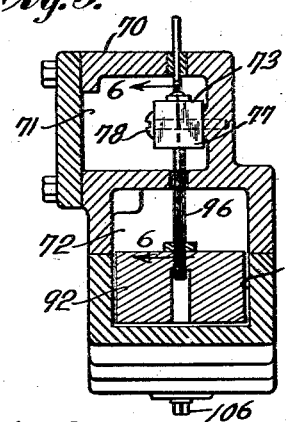
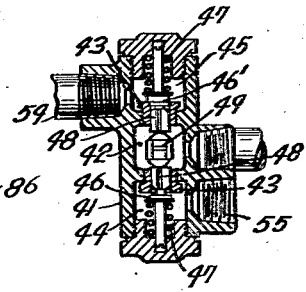
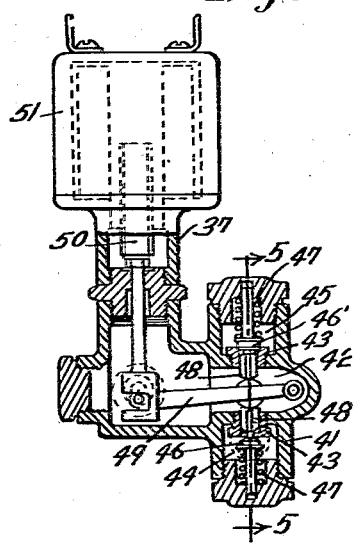
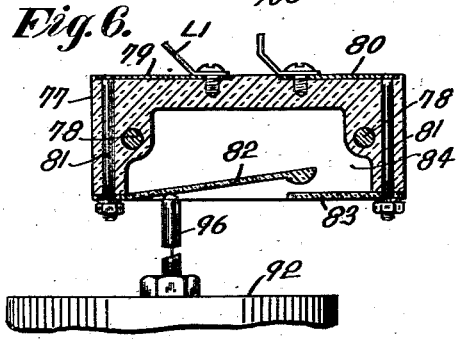
Inventor:
Wade H. Wineman.

Patented Dec. 28, 1943

2,337,582

UNITED STATES PATENT OFFICE 2,337,582

PRESSURE CONTROLLING APPARATUS

Wade H. Wineman, Michigan City, Ind., assignor to Sullivan Machinery Company, a corporation of Massachusetts Application December 27, 1941, Serial No. 424,673

17 Claims. (Cl. 230—31)

My invention relates to pressure controlling apparatus, and more particularly to means for controlling automatically the unloading and loading of a pump, such as an air compressor, in accordance with its discharge pressure, to maintain such discharge pressure within desired limits.

It is an object of my invention to provide improved means for controlling the operation of a pumping mechanism. It is another object to provide improved pressure responsive means for controlling the unloading and loading of a compressor. Still another object is to provide improved means for effecting a step-by-step unloading and reloading of a compressor. Another object is to provide an improved pressure responsive pilot mechanism which is operative at predetermined discharge pressures of a compressor for controlling the flow of pressure fluid relative to pressure responsive unloading devices for the compressor. Still another object is to provide an improved device for controlling the unloading of a compressor and having adjustable means operative to vary its responsiveness to the pressures to be controlled. A further object of the invention is to provide an improved control apparatus for providing a plurality of controlling operations in sequence upon predetermined variations in a pressure to be controlled. Still another object of the invention is to provide a pressure responsive control apparatus of very close regulation. Yet a further object is to provide an improved controlling apparatus of the float operated type. Other objects and advantages of the invention will hereinafter more fully appear.

In a preferred embodiment of my invention, for the accomplishment of the above and others of its objects, displacement of a liquid downwardly in a suitable compartment as the pressure to be controlled increases is utilized to effect the control of devices which control the source of the pressure to be controlled—in the case of a pumping-apparatus-produced pressure, step unloading means. Preferably, in an air compressor control system, I utilize floats to operate switches to control circuits which control unloading devices, but it will be appreciated that circuits may be establishd and broken directly between the liquid—such as mercury—and contacts arranged at different elevations, instead of having floats move switches which make and break control circuits. To provide extremely close regulation I preferably employ means for limiting very closely the pressure variations due to displacement of the liquid, to changes due solely to alterations in liquid level in the space from which displacement takes place, to this end providing displacement, in a preferred embodiment of the invention, to a large, suitably elevated receptacle positioned to provide the necessary head, and, due to its large horizontal area, involving only small pressure increases in the column communicating with it even when relatively considerable quantities of liquid are displaced. Obviously, however, displacement to chambers having substantial volumes of fluid under pressure entrapped in them, or other suitable arrangements, might be used. Desirably, if uniform steps of pressure variation between successive control steps be sought, displacement of equal volumes of liquid for each control step may be utilized.

In the accompanying drawings there is shown fore purposes of illustration one form which the invention may assume in practice.

In these drawings:

Fig. 2 is an enlarged vertical sectional view showing one of the unloading devices installed in the ends of the compressor cylinders.

Fig. 3 is an enlarged vertical sectional view of a portion of the control means taken on the plane of the line 3—3 of Fig. 1.

Fig. 4 is an enlarged view of another portion of the control means with parts shown in section, the view being taken on the planes of the line 4—4 of Fig. 1.

Fig. 5 is a sectional view taken on the line 5—5 of Fig. 4.

Fig. 6 is an enlarged vertical sectional view with parts broken away and taken on line 6—6 of Fig. 3.

Figure 1:
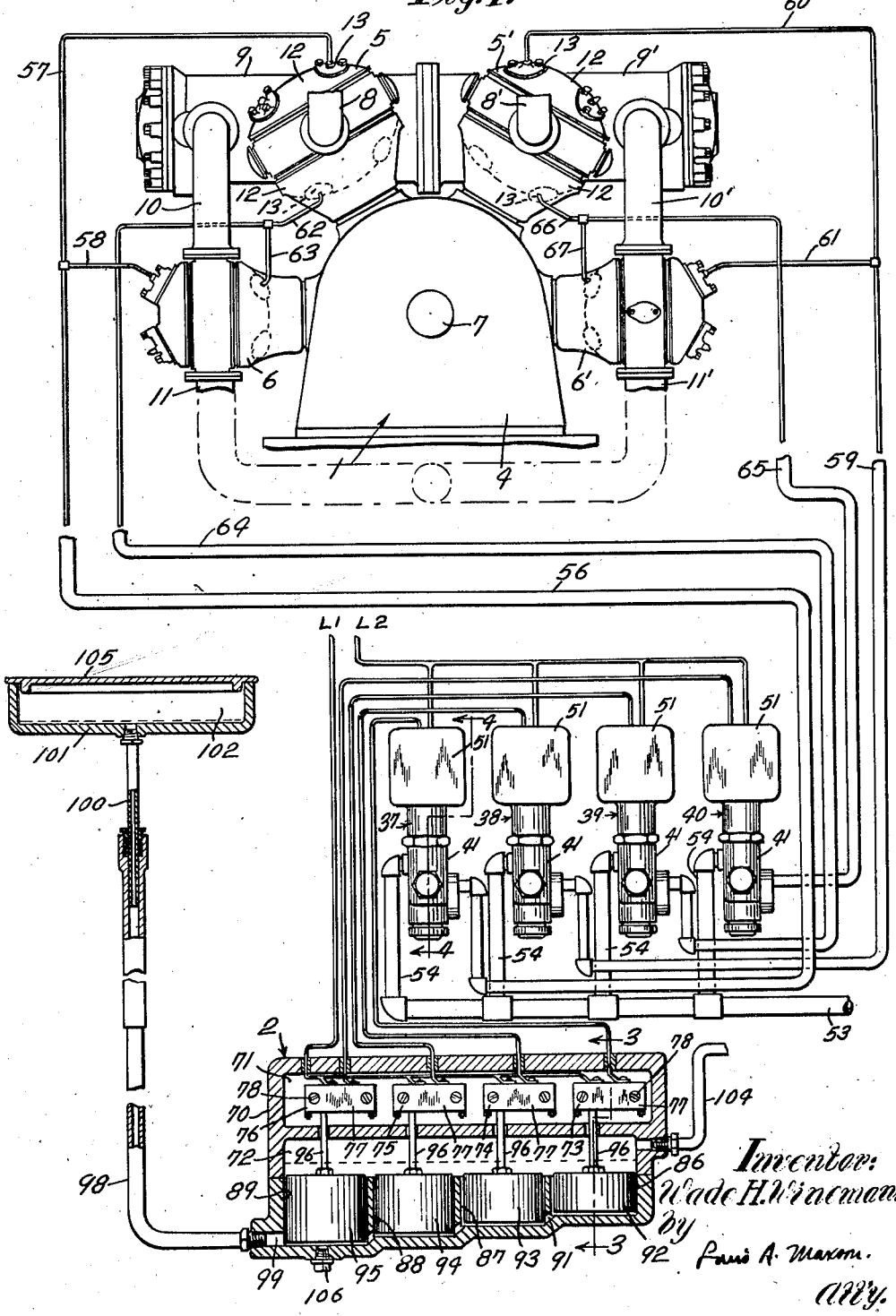
Fig. 1 is a diagrammatic view of a compound compressor having the improved illustrative embodiment of my control means associated therewith and governing loading and unloading, parts of the control means being shown on an enlarged scale and in section to illustrate structural details.

To illustrate the invention there is shown a compound compressor, generally designated 1, having the improved control means associated therewith and generally designated 2. It will be evident, however, that the control means may be utilized with compressors of various types, or with other mechanisms as well, and that the compressor shown herein is merely illustrative of one of the types of compressors with which the control means is adapted for use.

The compressor comprises a base or crankcase 4 having a pair of low pressure cylinders 5, 5' and a pair of high pressure cylinders 6, 6' projecting radially therefrom. Reciprocable within the low and high pressure cylinders are pistons, not shown, connected through suitable means to a crankshaft 7 journaled within the base 4 and driven by any suitable power means, not shown. Air is supplied through connections 8, 8' to the low pressure cylinders 5, 5', where it is compressed and discharged through intercoolers 9, 9' and connections 10, 10' to the high pressure cylinders 6, 6' where it is further compressed and whence it is discharged to connections 11, 11' leading to a storage tank, not shown, or to a point of use. The compressor cylinders shown are adapted for the compression of air on each stroke of their respective pistons, and arranged within cylinder heads 12 at both ends of the cylinders are unloading devices, generally designated 13.

Inlet valve devices 14 have, or at least one at each end of each cylinder has, as shown in Fig. 2, a follower member 15 which is received within a chamber 16 in the cylinder head and engages an inlet valve mechanism proper, generally designated 17, for holding the latter in place within an opening 18 connecting the chamber 16 in communication with a clearance space 19 at the end of the cylinder bore. Air is conducted to the chamber 16 through an inlet passage 20, and inlet valves 21 control the flow of air from the chamber 16 to the clearance space 19 and the cylinder bore. Attached to the outer end of the member 15, as by screws 23, is a cap 24 having a recessed inner surface which cooperates with a recessed end surface on the member 15 to form a chamber 25. A diaphragm 26 is clamped in the chamber 25 between the cap 24 and the member 15, and attached to the diaphragm is a rod 27 extending through an opening in the member 15 and carrying at its inner end a member having fingers 29 which are adapted to engage the inlet valves to unseat the latter and effect unloading. A suitable outer cover element 30 is secured, as by screws 31, to the cylinder head above the chamber 16, and a tubular clamping screw 32 is threaded through an opening in the cover element into engagement with the cap 24 for holding the member 15 in clamping engagement with the valve mechanism 17. Threaded on the outer end of the clamping screw is a guard cap 33 having an opening 34 through which pressure fluid may pass. Formed in the cap 24 in axial alinement with the screw 32 is a passage 35 opening into the chamber 25. When pressure fluid is supplied through the opening 34, the tubular screw 32 and the passage 35 to the chamber 25 at the outer side of the diaphragm, the diaphragm 26 is forced inwardly and moves the fingers 29 into engagement with the inlet valves for unseating the latter. When pressure fluid is vented from the chamber 25, the diaphragm 26 is forced outwardly by a spring 36 for moving the fingers out of engagement with the valves.

Valve devices, generally designated 37, 38, 39 and 40, are provided for controlling the flow of pressure fluid relative to the various unloading devices. Each of these valve devices comprises, as shown in Figs. 4 and 5, a valve casing 41 having a central chamber 42 communicating through valve bushings 43 with end chambers 44 and 45. Arranged in the chambers 44 and 45 are valve members 46 and 46' urged by springs 47 toward seats on the valve bushings for controlling the flow of pressure fluid between these chambers and the central chamber. The valve members 46 and 46' are provided with ribbed guide portions 48 projecting through the valve bushings into the central chamber to engage opposite sides of a lever 49 which is pivotally connected at one end to the valve casing and is connected at its other end to a plunger 50 extending into a coil of an electromagnet 51. Pressure fluid is supplied to the chambers 45 from a supply line 53 through branch connections 54. The chambers 44 are connected to atmosphere through vent ports 55. The central chamber of the valve device 37 is connected by a conduit 56 and branch conduits 57 and 58 to the unloading devices in the head ends of the low pressure cylinder 5 and the high pressure cylinder 6. A conduit 59 connects the central chamber of the valve device 38 to branch conduits 60 and 61 leading to the unloading devices in the head ends of the low pressure cylinder 5' and the high pressure cylinder 6'. The unloading devices in the crank ends of the low pressure cylinder 5 and the high pressure cylinder 6 are connected by conduits 62 and 63 to a conduit 64 leading to the central chamber of the unloading device 39. A conduit 65 connects the central chamber of the valve device 40 to branch conduits 66 and 67 leading to the unloading devices in the crank ends of the low pressure cylinder 5' and the high pressure cylinder 6'. It will be seen that on energizing the coils of the electromagnets, the levers 49 are swung upwardly about their pivots and force the valves 46' from their seats so that pressure fluid is supplied from the chambers 45 to the central chambers 42 where it enters the conduits 56, 59, 64, 65 and is conducted to the unloading devices for unloading the compressor cylinders. When the coils of the electromagnets are de-energized, the plungers 50 drop and swing the levers 49 about their pivots to open the valves 46 for venting pressure fluid from the unloading devices through the vent ports 55 in the lower chambers 44.

The energizing and de-energizing of the electromagnets are controlled by the improved control means 2. This control means, as illustrated, comprises a casing 70 having an upper chamber 71 and a lower chamber 72. Arranged in the chamber 71 are switches 73, 74, 75 and 76, each switch comprising, as shown in Fig. 6, a switch block 77 made of suitable insulating material and connected to the side of the casing 70, as by screws 78. At the top of the switch block are connecting elements 79 and 80 connected by current conducting rods 81 to switch elements 82 and 83 extending across a recess 84 in the lower surface of the block. The switch elements 82 and 83 are normally in engagement with each other, but the element 82 is adapted to be swung into the recess 84 out of engagement with the element 83. The connecting elements 79 of the switches are connected to a conductor L1 of a power line, and the connecting elements 80 of the switches 73, 74, 75 and 76 are connected, respectively, to the coils of the electromagnets for the valve devices 37, 38, 39 and 40. The other ends of the electromagnet coils are connected to the conductor L2 of the power line. To control the switches, suitable float means are provided, these including floats adapted to rise or fall as the liquid level changes in the chamber 72, and guided in any suitable manner so that they may maintain operating relationship with their associated switches.

Herein, I have shown formed in the lower chamber 72 of the casing 70 bores 86, 87, 88 and 89 of the same diameter and having their lower ends arranged at different levels, as shown in Fig. 1, and having their upper ends opening into the upper portion of the chamber. The bores are connected in communication with each other at their lower ends through passages 91. Received in the bores are pistonlike floats 92, 93, 94 and 95 varying in height so that their upper ends lie in the same horizontal plane when their lower ends rest upon the bottoms of their respective bores. Attached to the upper ends of the floats are rods 96 projecting upwardly through openings in the partition between the chambers 71 and 72 into engagement with the switch elements 82 of the switches 73, 74, 75 and 76. When the floats are at the lower ends of their bores, the switch elements 82 are permitted to engage the switch elements 83, but when the floats are moved upwardly only a slight amount, the switch elements 82 are moved out of engagement with the switch elements 83. The floats fit loosely within the bores so as to provide clearances connecting the lower ends of the bores in communication with the upper portion of the chamber 72. A connection 98 communicates with a passage 99 opening through the casing 70 into the lower end of the bore 89, this bore being the one having its lower end below the lower ends of the other bores. The connection 98 extends upwardly and has a tube 100 slidably received within its upper end. Attached to the upper end of the tube is a receptacle 101 having a chamber 102 of comparatively large cross-sectional area communicating with the interior of the tube. Liquid, such as mercury, is supplied to the chamber 102 where it enters the tube 100 and is conducted through the connection 98 to the lower end of the bore 89. As the level of the liquid rises in the bore 89, the float 95 will move upwardly and lift the switch element 82 of the switch 76. As the level of the liquid continues to rise, it enters the bore 88, then the bore 87 and finally the bore 86, and successively raises the floats in these bores, opening the switches 75, 74 and 73.

Compressor discharge pressure is supplied through a connection 104 to the upper portion of chamber 72 where it acts upon the surface of the liquid and opposes a rise in the level of the latter. A sufficient quantity of liquid is supplied to the system so that the liquid stands in the receptacle 101 even when the level of the liquid in the chamber 72 is high enough to provide the necessary buoyancy for lifting all the floats and opening the switches. Due to the large horizontal sectional area of the receptacle, the level of the liquid in the receptacle changes very little as the level of the liquid in the chamber 72 varies with the changing compressor discharge pressures, and the liquid pressure in the chamber 72 is, therefore, maintained substantially constant. The desired liquid pressure may be obtained by suitably filling the receptacle 101 with liquid and then adjusting the height of the receptacle by sliding the tube 100 in the connection 98 until the floats will have opened all of the switches at the compressor discharge pressures for which complete unloading is to take place. In order that the liquid in the receptacle may be subjected continuously to atmospheric pressure, a loose fitting cover 105 is provided for the receptacle. A drain plug 106 is provided in the casing 70 at the lower end of the bore 89 whereby liquid may be drained from the system. The dotted line in the chamber 72 may represent the level of the liquid in the latter when the surface of the liquid is not subjected to compressor discharge pressure. The dotted line in the chamber 102 may be thought of as representing the level of the liquid in that chamber at a time when all the floats are lifted and holding their respective switches open.

The mode of operation of the mechanism described is as follows: Assuming that the compressor discharge pressure is low and that the level of the liquid in the chamber 72 is such as to lift the floats and open the switches 73, 74, 75 and 76, then the electromagnets for the valve devices 37, 38, 39 and 40 will be de-energized and their plungers will be dropped to hold open the valves 46 for venting the unloading devices through the vent ports 55 opening into the chambers 44. The compressor will then operate fully loaded until the discharge pressure builds up and forces the liquid in the chamber 72 to a lower level. Since the float 92 possesses less buoyancy than the other floats, it will move down first as the liquid level drops and permit the switch 73 to close. When the switch 73 closes current is supplied from the conductor L1 of the power line through the switch to the coil of the electromagnet for the valve device 37, and through the coil to the conductor L2 of the power line. Current passing through the coil of the electromagnet causes its plunger to be lifted and open its associated valve 46′ permitting pressure fluid to flow from the chamber 45 to the chamber 42 where it enters the conduit 56 and is conducted to the conduits 57 and 58 leading to the unloading devices in the head ends of the low pressure cylinder 5 and the high pressure cylinder 6 and effects an unloading of these cylinder ends. If the discharge pressure continues to increase, the float 93 will move down next to permit switch 74 to close and energize the electromagnet for the valve device 38 and actuate the latter to supply pressure fluid through conduits 59, 60 and 61 to the unloading devices in the head ends of the low pressure cylinder 5′ and the high pressure cylinder 6′. On further increase in discharge pressure the float 94 moves down and permits closure of switch 75 for energizing the electromagnet of the valve device 39 so as to open its valve 46′ to supply pressure fluid through conduits 64, 62, and 63 to the unloading devices in the crank ends of the low pressure cylinder 5 and the high pressure cylinder 6. At the desired maximum discharge pressure, the float 95 moves down to permit switch 76 to close and energize the electromagnet for the valve device 40 so as to supply pressure fluid through conduits 65, 66 and 67 to the unloading devices in the crank ends of the low pressure cylinder 5′ and the high pressure cylinder 6′. The compressor is then driven completely unloaded until the discharge pressure drops and permits the level of the liquid in chamber 72 to rise and lift the floats to open the switches in the reverse order. As the switches are opened, the electromagnets are deenergized and their plungers drop to open the valves 46 and vent pressure fluid from the unloading devices.

As a result of this invention it will be noted that improved controlling means has been provided—an improved means which in its illustrative form is especially adapted for controlling the unloading of a compressor. The control means may be easily adjusted to operate within widely different pressure ranges by varying the height of the liquid column. It will be understood that the construction utilizing communicating bores with their bottoms arranged at different levels is not essential to the invention, utilization of other methods of float guidance being clearly within the scope of my invention. And floats of uniform size and shape but of different buoyancies, and floats of uniform cubic contents but different shape may obviously be used within the scope of my invention. If the operating range of the liquid level variation be kept between the top and bottom of the shortest float, most uniform operating conditions will be secured, but complete drainage of some of the chambers will not defeat satisfactory operation. If mercury be used as the operating liquid, very substantial operating forces can be secured in a compact device and with but small quantities of mercury needing to be displaced. From the foregoing it will be evident that a simple, certain, and very closely regulating device has been disclosed.

While I have in this application specifically described one form which my invention may assume in practice, it will be understood that this form of the same has been shown for purposes of illustration and that the invention may be modified and embodied in various other forms without departing from its spirit or the scope of the appended claims.

What I claim as new and desire to secure by Letters Patent is:

1. In a control device, a chamber, means for supplying liquid to said chamber at a substantially constant pressure, means for subjecting the upper surface of the liquid in said chamber to a pressure to be controlled, and control means including a float received within said chamber and adapted to be supported by said liquid when the level of the latter is at or above a predetermined height for controlling the pressure to be controlled.

2. In a control device, a chamber, means for supplying liquid to said chamber at a substantially constant pressure, means for subjecting the upper surface of the liquid in said chamber to a pressure to be controlled, and control means adapted to govern the pressure to be controlled, said control means including a plurality of floats of different sizes received within said chamber and adapted to be supported by said liquid.

3. In a control device, a chamber, means for supplying liquid to said chamber at a substantially constant pressure, means for subjecting the upper surface of the liquid in said chamber to a pressure to be controlled, and control means adapted to govern the pressure to be controlled, said control means including a plurality of floats received within said chamber and extending different depths below the surface of said liquid.

4. In a control device, a chamber, means for supplying liquid to said chamber at a substantially constant pressure, means for subjecting the upper surface of the liquid in said chamber to a pressure to be controlled, and control means for controlling said pressure at its source, said control means including a plurality of floats of different heights received within said chamber and extending to different depths below the surface of the liquid.

5. In a control device, a chamber, means for supplying liquid to said chamber at a substantially constant pressure, means for subjecting the upper surface of the liquid in said chamber to a pressure to be controlled, and control means including a plurality of floats having the same cross sectional areas and different heights for controlling the pressure to be controlled, said floats being received in said chamber and extending into the liquid to different depths below the surface of the latter.

6. In a control device, a chamber, a plurality of bores opening into said chamber, means for connecting the lower ends of said bores in communication with each other, means for supplying liquid at a substantially constant pressure to the lower end of one of said bores, means for supplying pressure fluid to said chamber above the upper ends of said bores, and control means for governing the pressure of the fluid supplied to said chamber, said control means including floats of different volume fitting loosely within said bores.

7. In a control device, a plurality of bores, means for supplying liquid at a substantially constant pressure to the lower ends of said bores, means for supplying fluid at pressures to be controlled to the upper ends of said bores, and control means including floats fitting loosely within said bores for governing the pressures at which fluid is supplied to said bores.

8. In a control device, a chamber, a plurality of bores opening into said chamber and having their lower ends arranged at different levels, means for connecting the lower ends of said bores in communication with each other, piston shaped floats fitting loosely within said bores, means for supplying liquid at a substantially constant pressure to the lower end of the one of said bores having of its lower end below the others, means for supplying fluid at pressures to be controlled to said chamber above the upper ends of said bores, and means actuated by said floats for controlling the pressures at which fluid is supplied to the upper ends of said bores.

9. In a control device, a plurality of bores having their lower ends lying in different horizontal planes, means for supplying liquid at a substantially constant pressure to the lower ends of said bores, means for supplying fluid at pressures to be controlled to the upper ends of said bores, and control means for governing said last mentioned means to effect a control of the pressures at which the fluid is supplied, said control means including floats fitting loosely within said bores and displacing different volumes of liquid.

10. In a control device, a chamber having a liquid therein, means for subjecting said liquid to the pressure of a fluid whose pressure is to be controlled, control devices governed by variations in the liquid volume in said chamber for controlling the pressure of the fluid at its source, and means for causing said liquid to oppose to the fluid pressure to which it is subjected a pressure varying as the liquid is displaced substantially only in accordance with the variations in the liquid level in said chamber.

11. In a control device, a chamber having a liquid therein, a liquid column extending from said chamber near the bottom thereof to a height to cause said liquid in said chamber to exert a desired pressure, said column terminating in a chamber of large horizontal area at its top, means for subjecting the surface of the liquid in said first chamber to a pressure to be controlled, and devices controlled by variation in the liquid level in said first chamber for controlling the source of the pressure to be controlled.

12. In an apparatus of the character described, a chamber deeper at one end than the other, means for supplying liquid under pressure to said chamber, means for delivering to said chamber a gaseous fluid to be controlled, floats providing different buoyancy in said chamber, and controlling means adapted to govern the pressure to be controlled positioned for actuation by said floats.

13. In an apparatus of the character described, a float chamber, floats of different buoyancy therein, means for delivering liquid to said chamber at substantially constant pressure, means for conducting gaseous fluid whose pressure is to be controlled to said chamber, and means for controlling the pressure of said gaseous fluid, said control means including devices positioned for actuation by said floats.

14. In combination, a compressor, unloading means for said compressor, and means for controlling said unloading means in accordance with compressor discharge pressure, said controlling means including a chamber, means for supplying liquid to said chamber under pressure, means for subjecting the upper surface of the liquid in said chamber to the discharge pressure of said compressor, and means responsive to changes in the level of the liquid in said chamber for controlling said unloading means.

15. In combination, a compressor, unloading means for said compressor, and means for controlling said unloading means in accordance with compressor discharge pressure, said controlling means including a chamber, means for supplying liquid to said chamber under pressure, means for subjecting the upper surface of the liquid in said chamber to the discharge pressure of said compressor, and means responsive to changes in the level of the liquid in said chamber for controlling said unloading means, said last mentioned means including a float adapted to be supported by the liquid when the surface of the latter reaches a predetermined level.

16. In a control device, a chamber having a liquid therein, means for subjecting the surface of the liquid in said chamber to a pressure to be controlled, means for causing the liquid level in said chamber to rise as the pressure acting on its surface falls and to fall as said pressure rises and to counterbalance the pressure to be controlled at the desired mean value of the latter at a level of the liquid in said chamber below the top of the latter and to limit the effects of the changes in liquid level which occur, upon the pressure opposed by the liquid to the pressure to be controlled, in such manner that the changes of liquid level in the chamber do not cause pressure changes substantially exceeding in value those which correspond to the changes in liquid head within the chamber, and means for controlling the pressure to be controlled including a plurality of floats normally supported by said liquid, each of said floats having a control device associated with it and each of said floats so supported by said liquid that it exercises a control of its respective control device at a different liquid level from any other.

17. In a control device, a chamber having a liquid therein, means for subjecting the surface of the liquid in said chamber to a pressure to be controlled, means for causing the liquid in said chamber to vary its level as the pressure acting on its surface varies and to exert an opposing pressure varying in close conformity with the variation in head occasioned solely by the changes in the level of the liquid in said chamber, and means for controlling the pressure to be controlled including a plurality of floats normally supported by said liquid, each of said floats having a control device associated with it and each of said floats so supported by said liquid that it exercises a control of its respective control device at a different liquid level.

WADE H. WINEMAN.

CERTIFICATE OF CORRECTION.

Patent No. 2,337,582. December 28, 1943.

WADE H. WINEMAN.

It is hereby certified that error appears in the printed specification of the above numbered patent requiring correction as follows: Page 1, second column, line 20, for "fore" read --for--; page 4, second column, line 34, claim 8, after "having" strike out "of"; and that the said Letters Patent should be read with this correction therein that the same may conform to the record of the case in the Patent Office.

Signed and sealed this 14th day of March, A. D. 1944.

Leslie Frazer (Seal) Acting Commissioner of Patents.